United States Patent Office 3,433,984
Patented Mar. 18, 1969

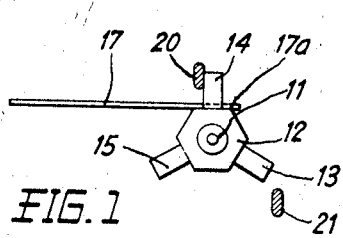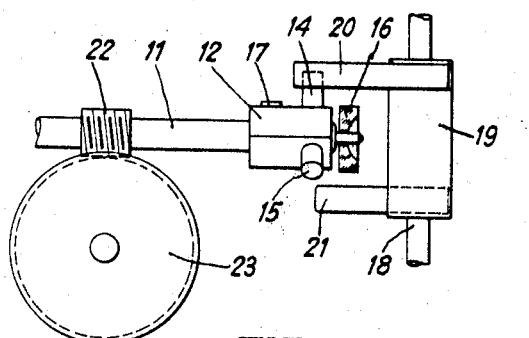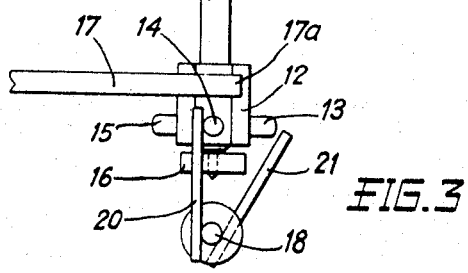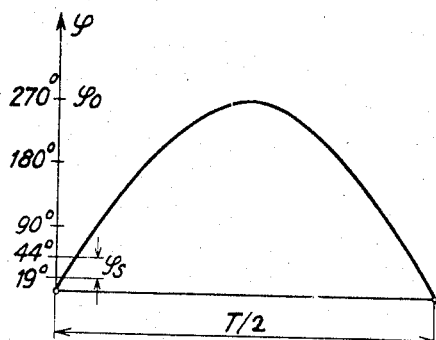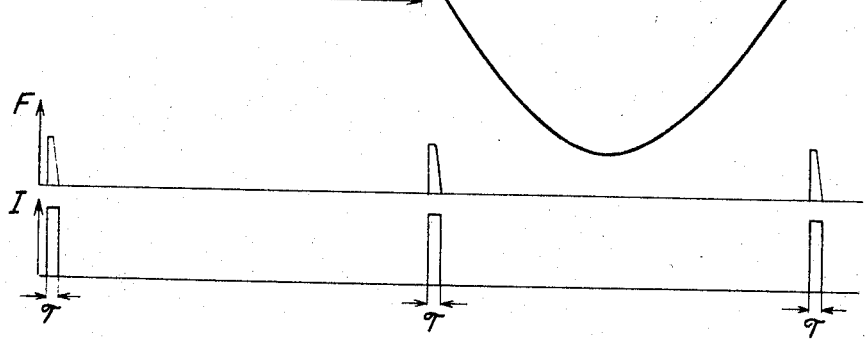

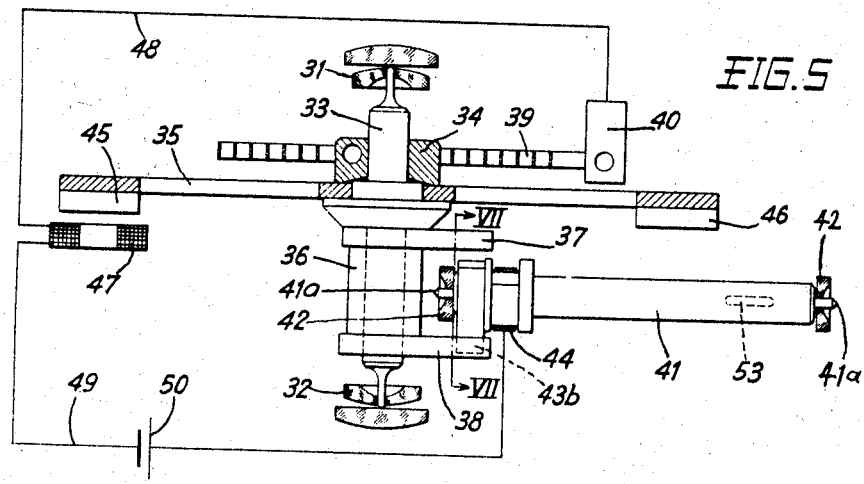
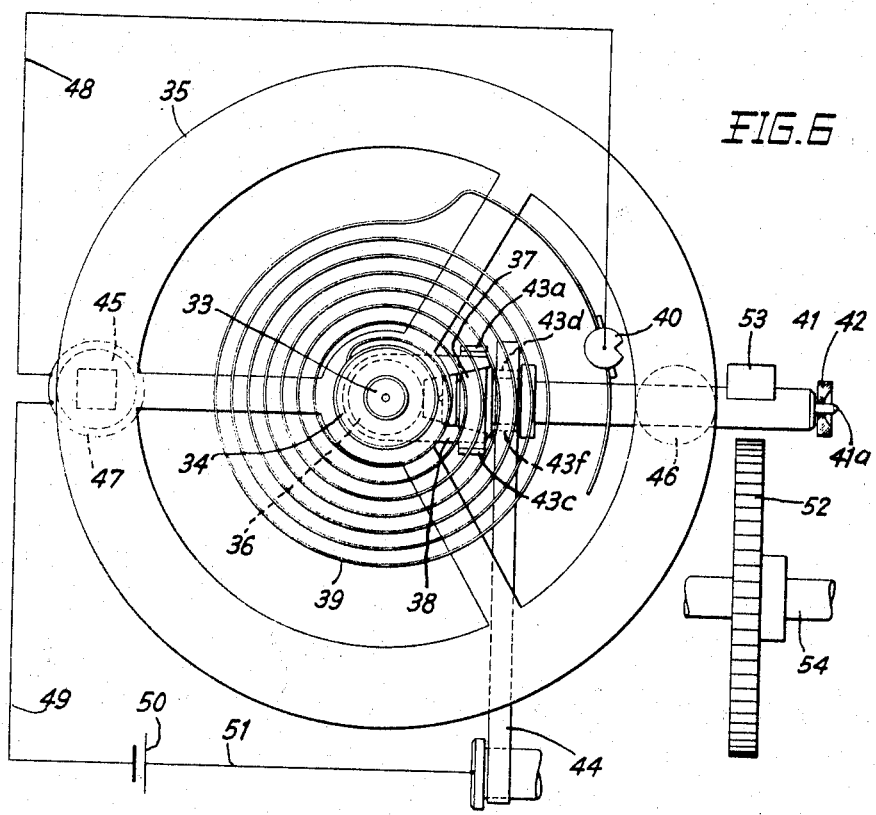

3,433,984
DEVICES FOR CONVERTING ROTARY VIBRATIONS INTO UNIDIRECTIONAL ROTARY MOVEMENT
Oswald Tschudin, Weil am Rhein, Germany, assignor to Brac Ltd., Breitenbach, Switzerland, a corporation
Filed Nov. 29, 1966, Ser. No. 597,783
Claims priority, application Germany, Nov. 29, 1965, T 29,894; Nov. 11, 1966, B 89,792
U.S. Cl. 310—37                            9 Claims
Int. Cl. H02k 7/06

The present invention relates to devices for converting rotary vibrations of a vibratory shaft into unidirectional rotary movement of a rotary shaft, for example for driving the indicators of a timepiece by means of a balance performing rotary vibrations.

If such devices are to operate with accurate timing it is necessary that no reactions which would cause doubt with respect to the timing accuracy are exerted by the driving system on the vibrating system, or in other words the free vibration of the rotary vibrator should not be hindered. While such devices must be provided with arresting devices for preventing return rotation of the rotary shaft, large energy losses should not be introduced by these arresting devices since they would also cast doubt on the timing accuracy. Moreover, the efficiency of such devices for converting rotary vibrations into unidirectional rotary movement necessitates a simple construction, which is contrary to the above requirements.

The present invention consists in a device for converting rotary vibration of a vibrating shaft into unidirectional rotary movement of a rotary shaft, wherein the vibratory shaft extends at a right angle to the rotary shaft with the axis of the vibratory shaft in the same plane as the axis of the rotary shaft and carries two arms enclosing, in the direction of the rotary shaft, an angle which is bisected in a rest position by said plane, the arms being arranged to act successively during each rotary vibration of the vibratory shaft on stepping cams arranged on the periphery of the rotary shaft.

To make the invention more readily understood, reference is now made to the accompanying drawings, which are given by way of example, and wherein:

FIG. 1 shows a plan view of a mechanism comprising a first embodiment of the invention;

FIG. 2 shows a view of the mechanism of FIG. 1 taken perpendicular to a plane containing two shaft axes of the mechanism;

FIG. 3 shows a view of the mechanism of FIGS. 1 and 2 taken in the direction of the axis of a vibrating shaft;

FIG. 4 shows an amplitude and force diagram of the mechanism of FIGS. 1 to 3;

FIG. 5 shows a view of a further mechanism taken perpendicular to the plane in which two shaft axes of the mechanism extend;

FIG. 6 shows a plan view of the mechanism of FIG. 5 taken in the direction of the axis of a vibrating shaft;

Figure 7:
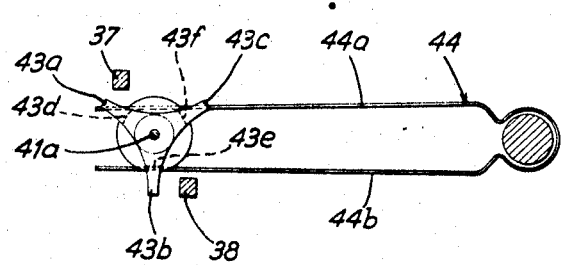
FIG. 7 shows a section taken along the line VII—VII of FIG. 5.

The embodiment illustrated in FIGS. 1 to 3 has a rotary shaft 11 which is journalled at one end in a bearing 16 and which is also journalled at its other end.

A six-sided prism 12 is provided on the rotary shaft 11, and on each of three alternate side faces carries a stepping pin, cam or tooth, three pins 13, 14 and 15 being provided in the present embodiment. The pins 13, 14 and 15 are thus disposed at angles of 120° with respect to one another. A leaf spring 17 serving as a detainer bears at its free end 17a flat against one of the six side faces of the prism 12. Perpendicular to the axis of the rotary shaft 11, and thus in a common plane therewith, there is arranged the axis of a vibrating shaft 18. Two arms 20 and 21 are secured on a collet 19 connected to the vibrating shaft 18, the arrangement being such that when the vibrating shaft 18 is in a rest position, the bisector of the angle between the two arms 20 and 21 lies in the same plane as the axes of the shafts 11 and 18. In addition the arms 20 and 21 and the pins 13, 14 and 15 are so arranged and constructed that only that one of the pins 13, 14 and 15 projects into the path of vibration of one of the arms 20 and 21 which lies in the same plane as the axes of the two shafts 11 and 18, when the rotary shaft 11 is in the position shown is the pin 14. In this way the movement to and fro of the arms 20 and 21 produces a stepped rotary movement of the shaft 11, the spring 17 holding the shaft 11 stationary between the stepping movements. For one complete rotation of the shaft 11 in the present embodiment, therefore, three complete vibrations of the vibrating shaft 11 are required. The shaft 11 can, for example, be provided with a worm 22 co-operating with a worm wheel 23. In that case it is of course advantageous if the shaft 11 is very well journalled, for example in the small journal bearing 16, and if it has a small moment of inertia, so that the reactions on the vibrating shaft 18 and the wear of the whole device can be kept small.

FIG. 4 shows the amplitude of the rotational vibration as a function of time. A maximum vibration of $\phi_0 = 270°$ is assumed, which is usual for timepieces. The thrust exerted by the vibrating arms 20 and 21 on the pins 13, 14 and 15 on the rotary shaft 11 begins, in the embodiment illustrated, where the angle between the two arms 20 and 21 is about 38°, about 19° after the neutral or null position, and ends after a vibration angle which is only slightly greater than half of the angle which the two arms 20 and 21 subtend with one another, and which is indicated in FIG. 4 by $\phi_0$ and is about 25°. The vibrating system is therefore loaded only for the part of the movement of the rotary vibrating shaft 18 which extends over the angle $\phi_0$ which as can be seen from the graph also lies in the region of the maximum speed of vibration of the shaft 18. During this movement the force of the spring 17 must of course be overcome. The thrust F, which is also shown in FIG. 4, decreases very quickly, since the spring 17 provides a part of its stress force for assisting the rotation of the rotary shaft 11 into a new position, with complete unloading of the vibrating system, as soon as the rotary shaft 11 has rotated through more than 1/12 of a rotation, i.e. through more than 30°, which is the case when the vibrating shaft 18 has swung through about 35° from its neutral position. The thrust therefore acts only very briefly, so the reaction of the rotary shaft on the vibrating system is likewise brief.

FIGS. 5 to 8 illustrate embodiments of the invention comprising driving and timing elements of timepieces. In the embodiments shown in FIGS. 5 to 7, a rotary vibrator is formed by a balance shaft 33 mounted in two bearings 31 and 32, a collet 34 mounted on the balance shaft 33, a balance 35 secured to the balance shaft 33 and a sleeve 36 on the balance shaft 33. Two arms 37 and 38 are seated on the sleeve 36 and may be formed in one piece with the sleeve 36. The inner end of a spiral balance spring 39 is secured to the collet 34 the outer end being secured to a retainer 40. A rotary shaft 41 is arranged perpendicular to the balance shaft 33 and has journals 41a mounted in non-conductive bearings 42. Three stepping cams 43a, 43b and 43c are provided on the rotary shaft 41 and are formed by the arms of a three-armed stepping gear. The ends of the arms furthest from the balance shaft 33 have only half the radius of the cams 43a, 43b and 43c and have ends 43d, 43e and 43f on which two arms 44a and 44b of a spring 44 can lie as shown in FIG. 7. The rotary shaft 41, which is driven by the to and fro vibrating balance 35 and by the two arms 37 and 38 carried on the balance 35, in the manner described with reference to FIGS. 1 to 4, to drive by means of a reduction gearing which in the present case is formed by a gear 52, which has sixty teeth, and a stepping tooth 53 meshing therewith, a seconds indicator of a time piece mechanism, the seconds indicator being carried on a shaft 54. The vibration of the balance 35 can be maintained electrically in known manner; on the balance there is provided a permanent magnet 45 having one pole above, and the other pole below, the balance 35. A non-magnetic counterweight 46 keeps the balance 35, which is unbalanced because of the magnet 45 and the two arms 37 and 38, in balance. A coil 47 secured to the chassis of the device is arranged so that the magnet 45, when the balance 35 is in its mean position, and thus when the spiral spring 39 is completely unstressed, lies exactly above the coil 47, the bisector of the angle between the two arms 37 and 38 extending exactly in the direction of the shaft 41 when the balance 35 is in this position. One end of the coil 47 is connected by a conductor 48 to the spring 39, and the other end of the coil is connected by a conductor 49 to a battery 50, which in turn is connected by a conductor 51 to the spring 44. The battery circuit is therefore closed when one of the two arms 37 or 38 bears against one of the stepping cams 43a, 43b or 43c. This is the position in which on one hand the drive force of the rotary shaft 38 is transmitted to the rotary shaft 41, and on the other hand in which, as shown in FIG. 4, the rotary shaft 38 is at almost its maximum speed. In this way good operational reliability is obtained since when, for example, directly after the mechanism is put in operation the amplitude has not yet reached its maximum value, the duration of the current supply is increased, and in the other case when the amplitude for any reason is too large, the duration of the current supply is decreased. Contact interruptions caused by bouncing or weak contact or other indefinite conditions, which usually cause not only movement inaccuracy but also damage to the contact surfaces, will not occur since the stepping operation is a very positive operation which can be controlled without further measures and in which two rigid parts bear securely against one another during a completely defined time.

FIG. 4 shows, in addition to the vibration amplitude $\phi$ and the thrust F as a function of time $t$ also the times $\tau$ during which the circuit is closed and during which a current I flows.

Figure 8:
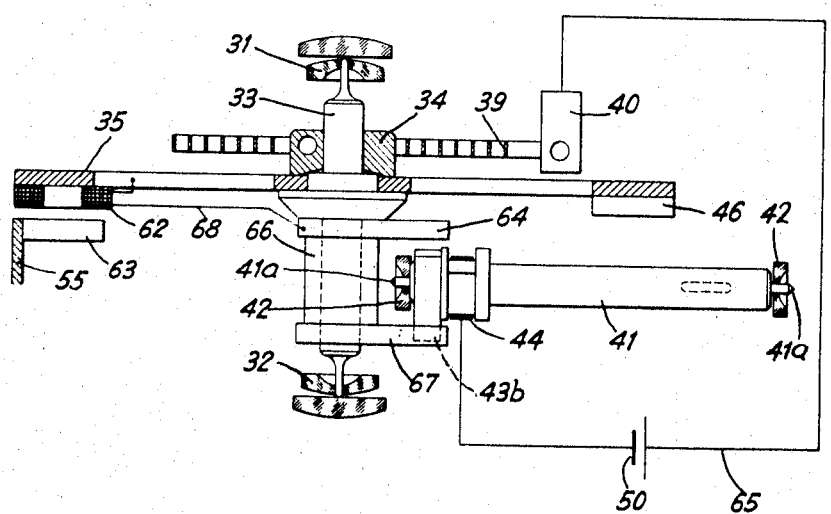
FIG. 8 shows a third embodiment in a view corresponding to that of FIG. 5.

FIG. 8 shows a further embodiment of the invention in which those parts which correspond to parts of the embodiment illustrated in FIGS. 5 to 7 are indicated by the same reference numerals. The embodiment shown in FIG. 8 differs from the embodiment of FIGS. 5 to 7 in two respects: firstly, a drive coil 62 is secured to the balance 35, while a permanent magnet 63 is arranged on the chassis 55. Consequently, a conductor 65 extends from the battery 50 to the retainer 40, which is conductively connected with the spiral spring 39. The spiral spring 39 is in turn connected by the collet 34 and the balance shaft 33 to the balance 35. One end of the coil 62 is secured to the balance 35, and the other end of the coil 62 is connected by a conductor 68 to an arm 64 on a synthetic plastic material sleeve 66, which may be formed in one piece with a second arm 67, although it is of course also possible to make the second arm 67 of metal and to arrange it so that it is not conductively connected with the balance shaft 33. With this construction of the arms, the vibrator receives only one electromagnetic impulse for each complete vibration T, in distinction to the first embodiment, in which it obtains an impulse for each half vibration $T/2$.

It would of course also be possible to construct an embodiment with a fixed coil, a movable permanent magnet and only one electrically conductive contact arm or an embodiment with a stationary permanent magnet, a movable coil and two conductive contact arms.

It is a feature of the embodiments shown in FIGS. 5 to 8 that the contact arm transmitting the rotary impulse also serves as an electrical switch element producing a rectangular impulse so that no spring or other contact elements are required.

What we claim is:

1. A device for converting rotary vibration of a vibratory shaft into unidirectional rotary movement of a rotary shaft, wherein the vibratory shaft extends at a right angle to the rotary shaft with the axis of the vibratory shaft in the same plane as the axis of the rotary shaft and carries two arms enclosing, in the direction of the rotary shaft, an angle which is bisected in a rest position by the said plane, the arms being arranged to act successively during each rotary vibration of the vibratory shaft on stepping cams arranged on the periphery of the rotary shaft.

2. A device as claimed in claim 1, wherein the rotary shaft carries a stepping wheel on which three of the stepping cams are disposed at angles of 120° with respect to one another, and the arms of the vibratory shaft are arranged so that for three complete vibrations of the vibratory shaft a complete rotation, effected in six separate rotary steps, of the rotary shaft is produced.

3. A device as claimed in claim 1, wherein the rotary shaft carries a prism co-axial with the rotary shaft and provided with a number of side faces corresponding to the number of rotary steps required for a complete rotation of the rotary shaft, at least one fixed detainer spring acting on the side faces of the prism.

4. A device as claimed in claim 1, wherein the rotary shaft is provided with a number of faces corresponding to the number of stepping cams, the faces co-operating with at least two fixedly arranged springs for releasably detaining the rotary shaft.

5. A device as claimed in claim 4, wherein the two springs are the arms of a U-shaped spring and are arranged to bear alternately against one of the faces for releasably detaining the rotary shaft.

6. A device as claimed in claim 1, wherein at least one of the arms is electrically conductive and is electrically conductively connected by an electric battery and a coil with the stepping cams on the rotary shaft, the coil and a permanent magnet forming means for driving the vibratory shaft.

7. A device as claimed in claim 6, wherein both of the arms are electrically conductive, the coil and the permanent magnet being arranged with respect to one another so that from mean position of the vibratory shaft a thrust to both sides is effected.

8. A device as claimed in claim 6, wherein only one of the arms is electrically conductive, the vibratory shaft receiving only one impulse for each complete vibration.

9. A device as claimed in claim 6, wherein the rotary vibrator has a frequency of $n$ cycles per second, the rotary shaft being provided with $n$ stepping cams, and a stepping tooth being provided on the rotary shaft for driving a 60-toothed gear.

References Cited

UNITED STATES PATENTS

| | | | |
|---|---|---|---|
| 3,053,041 | 9/1962 | DeGryse et al. | 74—1.5 XR |
| 2,835,105 | 5/1958 | Favey | 310—39 XR |
| 2,957,116 | 10/1960 | Hurd et al. | 310—36 XR |
| 3,096,452 | 7/1963 | Haydon | 310—36 XR |

MILTON O. HIRSHFIELD, *Primary Examiner.*

B. A. REYNOLDS, *Assistant Examiner.*

U.S. Cl. X.R.

310—36, 39; 318—119; 58—23; 74—1.5